US005203538A

United States Patent [19]

Matsunaga et al.

[11] Patent Number: 5,203,538

[45] Date of Patent: Apr. 20, 1993

[54] SOLENOID VALVE DEVICE

[75] Inventors: Nobuhiko Matsunaga; Yoshihiko Moriya, both of Iwata, Japan

[73] Assignee: Yamaha Hatsudoki Kabushiki Kaisha, Iwata, Japan

[21] Appl. No.: 783,830

[22] Filed: Oct. 29, 1991

[30] Foreign Application Priority Data

Oct. 31, 1990 [JP] Japan ........ 2-296686

[51] Int. Cl.[5] ........ F16K 31/06; B05B 1/30

[52] U.S. Cl. ........ 251/129.19; 251/129.16; 251/77; 239/585.1

[58] Field of Search ........ 251/129.19, 77, 129.16; 239/585.1

[56] References Cited

U.S. PATENT DOCUMENTS 2,041,416 5/1936 Johnson ........ 251/129.19 X
4,120,596 10/1978 Kunkle ........ 251/77 X
4,484,727 11/1984 Harris et al. ........ 251/77
4,540,155 9/1985 Redston et al. ........ 251/77 X
4,844,339 7/1989 Sayer .

FOREIGN PATENT DOCUMENTS 503295 7/1956 Italy ........ 251/129.19

*Primary Examiner*—Arnold Rosenthal
*Attorney, Agent, or Firm*—Ernest A. Beutler

[57] ABSTRACT

A solenoid valve device and specifically a solenoid operated injection valve wherein the bouncing of the valve element upon closing is dampened. This is done by providing an inertial mass which is slidable relative to the stem portion of the valve element and contacts fixed abutments on the stem portion of the valve element to limit the relative movement in each direction. In addition, a cushioning arrangement is interposed between the inertial mass and the abutment for cushioning the stopping of the inertial mass.

21 Claims, 6 Drawing Sheets

SOLENOID VALVE DEVICE

BACKGROUND OF THE INVENTION

This invention relates to a solenoid valve device and more particularly to an improved solenoid operated fuel injection valve.

In the interest of improving fuel economy and exhaust emission control for internal combustion engines, the use of fuel injection is widely accepted. One particularly popular form of fuel injector employs a pintle or poppet type valve which is operated by an electrical solenoid. In order to control the opening of the valve, the solenoid cooperates with an armature which is normally rigidly affixed to the valve stem and when energized is attracted to the solenoid to open the poppet valve. When the solenoid is deenergized, a spring urges the valve to its closed position. Due to the high speed of fuel injection, the movements aforenoted (opening and closing) occur quite rapidly. One difficulty in connection with the use of solenoid operated valves is that the mass of the armature, which is normally affixed to the upper end of the valve stem and remotely from its valving surface, causing elongation of the valve stem upon closing. When the elongated stem returns to its normal length, a force is created on the valve which tends to effect its opening. Hence, a characteristic known as "bouncing" has become accepted with this type of valve.

However, the subsequent openings of the valve after the main injection cycle can give rise to numerous problems. Of course, this will affect the control of the amount of fuel that is delivered to the engine. More importantly, however, the bouncing operation can cause fuel to be injected at the time when ignition is occurring. When this happens, ignition may occur more rapidly and less uniformly than is desired and a condition known as "misfire" can occur.

An arrangement has been proposed so as to try to minimize the affect of bouncing of a solenoid operated valve by having the armature slideably supported on the valve stem. The armature contacts a stop on the valve stem for moving the valve in an opening direction but contacts a fixed abutment when moving in the closing direction and the armature moves independently of the valve stem. Although this tends to reduce bouncing, in some instances it can not only not provide adequate bouncing protection but may even aggravate the problem. For example, when the sliding armature contacts the fixed stop it will be forced back against the valve stem and can urge the valve stem toward its opened position.

It is, therefore, a principal object of this invention to provide an improved injector valve assembly for a fuel injection system wherein bouncing of the valve element is substantially eliminated.

It is a further object of this invention to provide an improved solenoid operated injection valve wherein the connection between the armature and the valve stem permits relative movement to eliminate or substantially bouncing.

SUMMARY OF THE INVENTION

A first feature of this invention is adapted to be embodied in an injector valve for a fuel injection system comprising an injection valve element comprised of a head portion adapted to selectively open and close a valve seat and a stem portion. An inertial mass is supported for movement along the stem portion in opposite directions along the axis of the stem portion and a pair of spaced apart abutment means are fixed relative to the stem portion and engageable with the inertial mass for limiting the movement of the inertial mass relative to the injection valve element in both directions.

Another feature of the invention is adapted to be embodied in an injection valve for a fuel injection system comprised of an injection valve element comprised of a head portion adapted to selectively open and close a valve seat and a stem portion. An inertial mass is supported for movement along the stem portion in opposite directions along the stem portion. The inertial mass is adapted to engage a first abutment on the stem portion upon movement of the inertial mass in a valve opening direction. The inertial mass is also adapted to engage a second abutment when moving in the valve closing direction for limiting the degree of movement of the inertial mass relative to the stem portion. In accordance with this feature of the invention, a cushioning device is interposed between the inertial mass and the second abutment for reducing the likelihood of the inertial mass being forced back into engagement with the first abutment to effect reopening of the valve on closing.

FURTHER DESCRIPTION OF THE PRIOR ART

Figure 1:
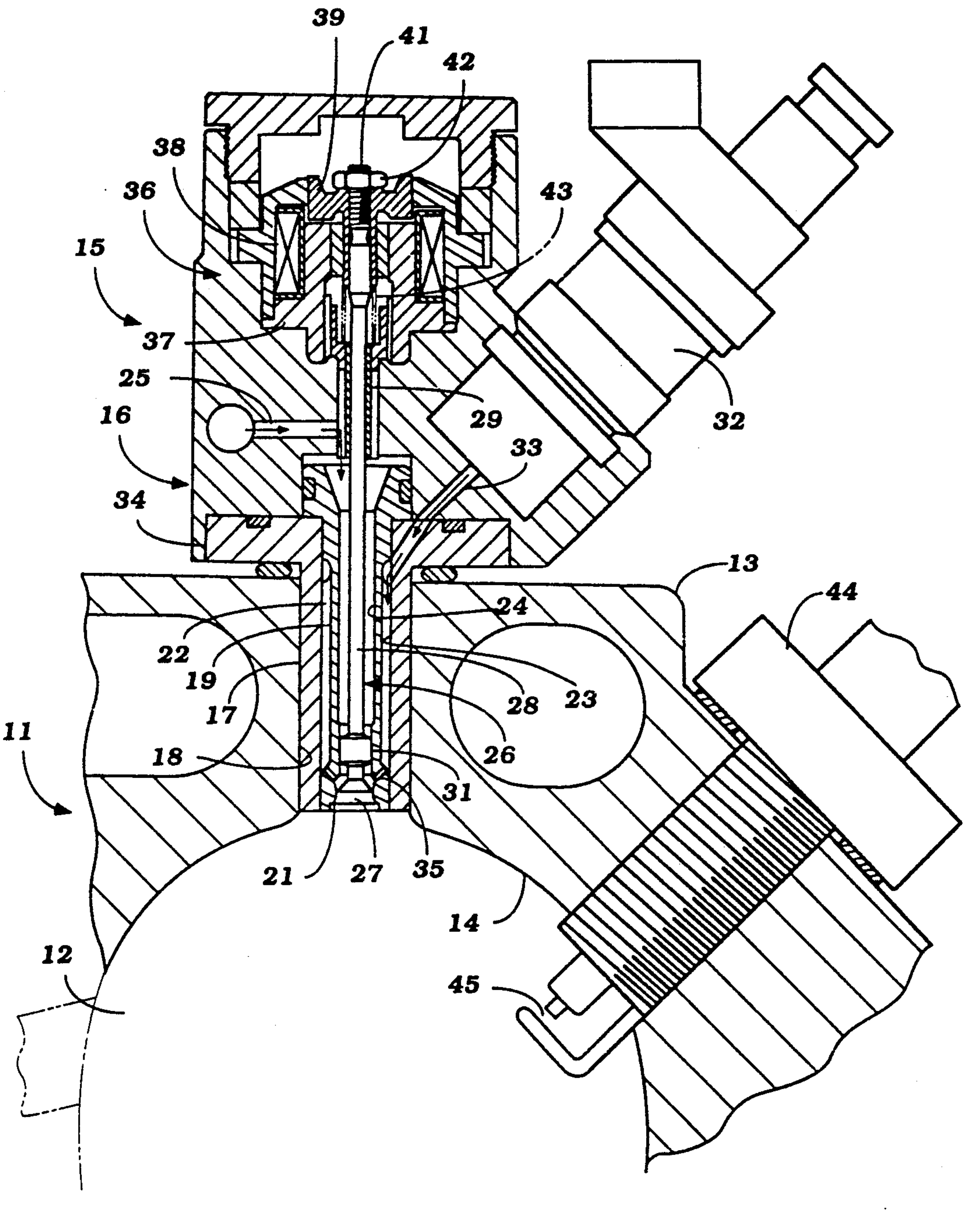
FIG. 1 is cross sectional view taken through the cylinder head of an internal combustion engine having a fuel injector constructed in accordance with a prior art type of construction.
Figure 2:
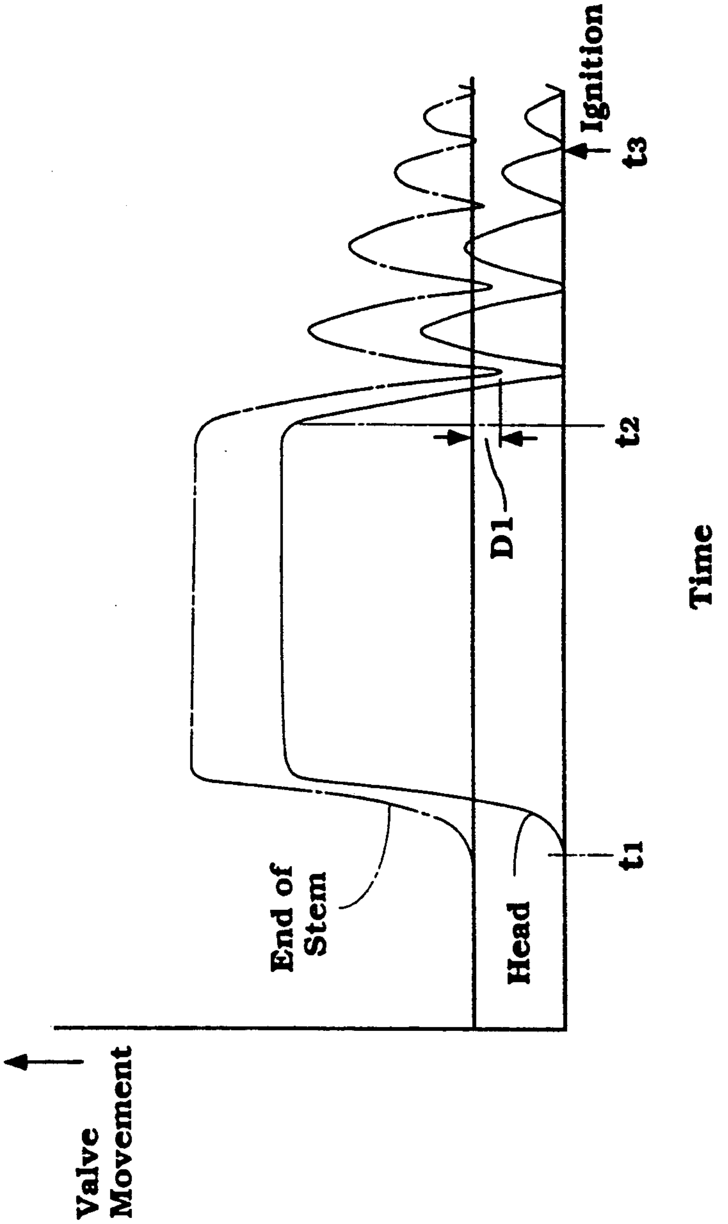
FIG. 2 is a graphical view showing the movement of the head and stem portions of the valve during a cycle of operation and shows how the prior art type of valve can result in bouncing.

The disadvantages of the prior art constructions previously described may be best understood by reference to FIGS. 1 and 2. As noted, FIG. 1 is a cross sectional view taken through a portion of an internal combustion engine having a fuel injector constructed in accordance with a prior art type of construction. The engine is depicted generally by the reference numeral 11 and only the cylinder head portion which defines the combustion chamber 12 is illustrated. The cylinder head 13 has a recess 14 which defines in part the combustion chamber 12. The remainder of the combustion chamber will be defined by the bore of a cylinder formed in an associated cylinder block and the head of a piston, neither of which component is illustrated. The engine 11 may operate either on a four stroke or two stroke principal although a two stroke engine is depicted.

A fuel injector assembly which is, in the described construction, an air fuel injector, identified generally by the reference numeral 15, and of a conventional prior art type of construction. The air fuel injector 15 is comprised of a body portion 16 that includes a cylindrical nozzle piece 17 that is fixed within a threaded bore 18 of the cylinder head 13 and which has a insert piece 19 that defines a valve seat 21. A first cavity 22 is formed around the periphery of the insert piece 19 and a bore 23 of the nozzle piece 17. A second cavity 24 is formed internally of the insert piece 19. Compressed air is delivered to the cavity 24 from an external air source (not shown) through a manifold 25.

An injection valve, indicated generally by the reference numeral 26 has a head portion 27 that is adapted to cooperate with the valve seat 21 for controlling the emission of fuel and air under pressure into the combustion chamber 12. The injection valve 26 has an elongated stem portion 28 which extends from the head portion 27 upwardly through the cavity 24 and which is slidably supported within a guide 29 fixed in the upper portion of the housing assembly 16 adjacent the air manifold 25. The stem 28 has protrusions 31 that engage the inner side of the insert 19 so as to slidably support the valve head 27 while permitting the flow of compressed air there passed.

A fuel injector 32 is mounted within the housing assembly 16 and receives fuel under pressure from a suitable source. The fuel injector 32 may be an electrically operated type and discharges a spray of fuel through a passage 33 formed in the housing portion 16 and in a portion of an enlarged cylindrical part 34 of the nozzle piece 17. This passage 33 communicates with the chamber 22. The chamber 22, in turn, communicates with the valve seat 21 through a plurality of passages 35 so that when the valve head 27 is in its opened position fuel will be mixed with the compressed air flowing from the manifold 25 through the chamber 24 and into the combustion chamber 12.

The injector valve 26 is operated by an electrical solenoid assembly, indicated generally by the reference numeral 36 which is comprised of a core piece 37 which is threaded to the upper end of the insert piece 29 and received at the upper end of the housing assembly 16. A solenoid winding 38 encircles the core 37 and cooperates With an armature 39 that is affixed to a threaded portion 41 of the valve stem 28 by means of a retaining nut 42. The armature has a cylindrical projection which extends around the upper portion of the valve stem 28 and which is engaged by a coil compression spring 43 for urging the injection valve 26 to its closed position wherein the head portion 27 engages the seat 21. The armature 39 is threaded to the threaded portion 41 and the nut 42 acts as a lock nut for retaining the armature 39 in its axial position.

When the solenoid winding 38 is energized, the armature 39 will be drawn downwardly and the spring 43 will be compressed to open the injection valve 27. Compressed air then flows from the manifold 25 through the chamber 24 into the combustion chamber 12. At some time, preferably simultaneously with the opening of the injection valve 26, the fuel injector 32 is actuated so as to inject fuel through the passage 33 and chamber 22 for discharge through the ports 35 into the combustion chamber with the air charge, as aforenoted.

After the appropriate time, which can be selected in any suitable manner, the solenoid winding 38 is deenergized and the coil compression spring 43 will urge the armature 39 and valve 26 back to its closed position. Subsequently a spark plug 44 mounted in the cylinder head 13 with its gap 45 disposed in the combustion chamber disposed within the combustion chamber 12 is fired.

FIG. 2 shows the disadvantages of the prior art type of construction. This is a graph showing the valve movement of both the head portion 27 and the stem portion adjacent the armature 39 in relationship to.time. At a point in time t1 the solenoid 38 is energized and the valve will begin to open. The valve continues to be held open until a point in time t2 when the winding 38 is deenergized and then the valve will move toward its closed position. When this occurs, the head 27 will impact on the seat 21 and close the injector valve. However, due to the higher mass of the armature 39 and its attaching portion to the valve stem 28, the valve stem will actually elongate a distance D1. This elongation will then relax and the armature 39 will move downwardly toward the valve head 27 and this in effect causes an opening force on the valve head 27 as shown in FIG. 2. This operation continues until the motion has been fully damped. Because of this, however, at the point of time t3 of ignition of the spark plug 44 fuel may be sprayed into the gap 45 so as to cause more rapid and uneven firing of the charge in the combustion chamber. This can cause a misfire and actually stop the ignition. In addition, since the valve head 27 may be open at this time, soot and other particles may be deposited on the valve seat 21 and valve head 27 to prevent full closing. Therefore, the prior art has the disadvantages as aforenoted.

DETAILED DESCRIPTION OF THE PREFERRED EMBODIMENTS OF THE INVENTION

Figure 3:
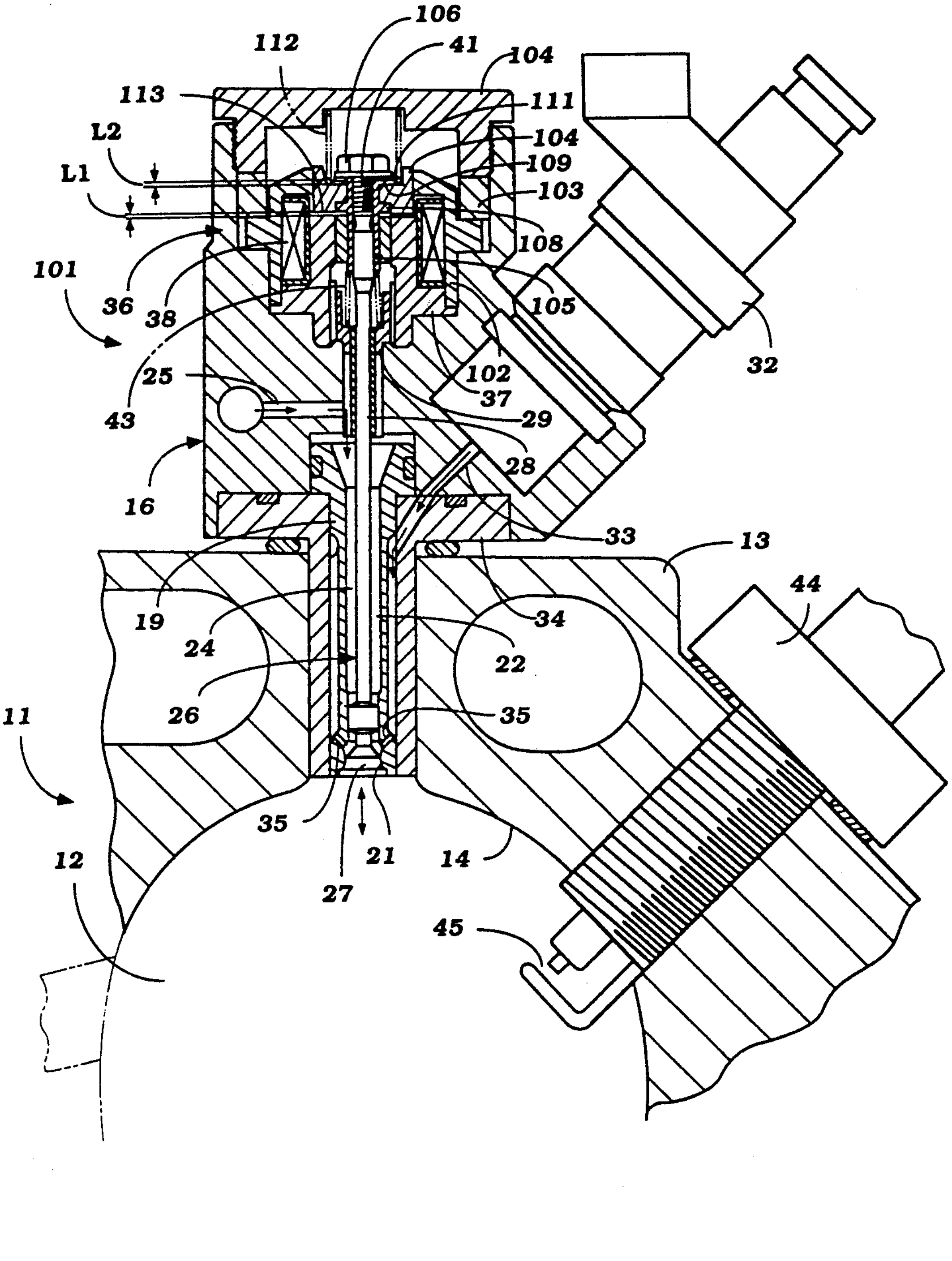
FIG. 3 is a cross sectional view, in part similar to FIG. 1, and shows a first embodiment of the invention.
Figure 4:
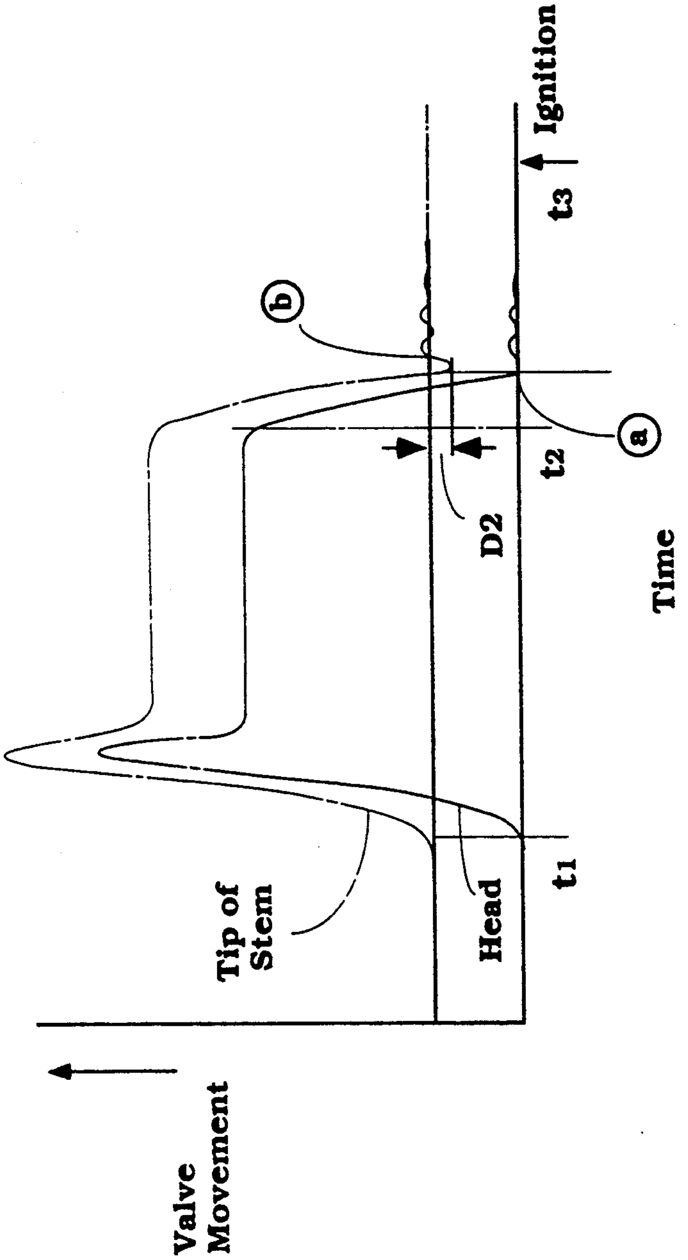
FIG. 4 is a graphical view, in part similar to FIG. 2, and shows the movement of the portions of the valve constructed in accordance with this embodiment of the invention.

Referring first to FIGS. 3 and 4, these are figures which correspond to FIGS. 1 and 2 of the prior art construction but in which an injection valve constructed in accordance with a first embodiment of the invention and identified generally by the reference numeral 101 is employed. The relationship of the injection valve 101 to the engine 11 is the same as in the prior art and, therefore, those parts of the prior art construction which are the same are identified by the same reference numerals. In addition, the major portions of the injector 101 are the same as the prior art type of construction and, for that reason, portions which are the same have been identified by the same reference numerals and will not be described again, except in so far as is necessary to understand the construction and operation of this embodiment. Basically, the difference between this embodiment and the prior art construction is the manner in which the armature is associated with the stem 28 of the injector valve 26.

As can be seen in FIG. 3, the solenoid 36 has an outer yoke 102 that is retained within a cavity formed in the upper end of the housing 16 by means of a retaining ring 103 and threaded cap 104. A sleeve 105 has a threaded connection to the threaded valve stem portion 41 and is held in place by a lock nut 106.

In this embodiment an armature piece 107, which may be considered as an inertial mass, is positioned between a pair of oppositely facing shoulders defined by enlargements 108 of the sleeve 105 and the lower surface of the nut 106. An elastomeric type of damping material 109, having a characteristic as to be described, is held on the under side of the nut 104 and is adapted to be engaged, upon closing movement, by an upwardly facing shoulder 111 of the armature 107. A coil compression spring 112 is loaded between the cap 104 and the armature 107 for maintaining a normal gap L2 between the damping member 109 and the armature surface 111. Also, the spring 112 acts against the spring 43, but has a much lighter rate so as to maintain a gap L1 between the lower portion of the shoulder forming member 108 and an abutment surface 113 of the solenoid core 37.

The operation of this embodiment will be described by reference to FIGS. 3 and 4 and FIG. 3 shows the steady state closed position. When the solenoid winding 38 is energized at the point t1, the armature 107 will be drawn downwardly and since it has a direct abutment with the shoulder 108, the valve 26 will also be urged immediately toward its open position. However, once the armature 107 strikes the abutment surface 113 its downward motion will stop. However, the valve 26 may continue to move since the armature is slidably supported on the sleeve 105 and this motion will continue until the cushioning member 109 engages the upper armature surface 111. The member 109 is formed from a material having a small restitution coefficient such as rubber, resinous plastic, and the like and hence the downward or opening motion will be dampened and the valve head 207 will be returned to its normal full open position by the action of the spring 43.

When the winding 38 is deenergized at the time t2, the spring 43 will urge the valve 26 toward its closed position and the armature 107 will also move upwardly. When the valve head 27 engages the seat 21, the movement of the valve 26 will be stopped and the mass of the upper end of the valve 26 will cause some elongation, D2. However since the armature 107 will slip along the sleeve 105 by compressing the spring 112 this mass will not cause any elongation of the valve stem and contribute to the bouncing problem common with the prior art construction. This slipping motion will continue until the armature 107 surface 111 contacts the cushioning member 109. The action of the cushioning member 109 will cushion the impact of the armature. The contact of the armature will create a closing force on the valve 26 that will tend to reduce the likelihood that it will, by its own seating action or by the subsequent contraction, bounce open again. As may be seen from the graph in FIG. 4, the device provides less bounce than the prior art type of constructions and also that any bounce that is existent will be dampened before the time of ignition.

It has been found that the damping operation for preventing bouncing can be best obtained if the weight of the armature 107 is set equal to the weight of the upper end of the valve assembly 26. This upper end of the valve assembly 26 includes the upper portion of the stem including the threaded portion 41, the sleeve 108, the nut 106 and the damping member 109.

Figure 5:
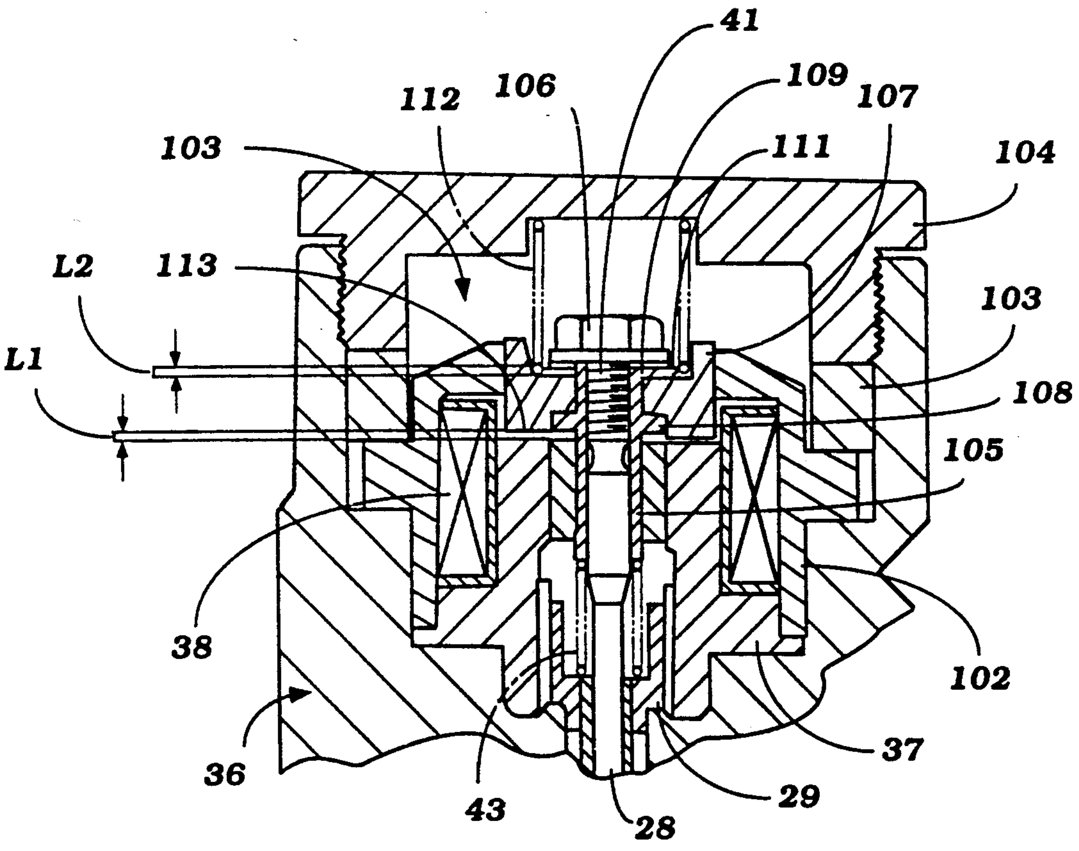
FIG. 5 is a partial cross sectional view, in part similar to FIG. 3 and shows another embodiment of the invention.

In the embodiments of FIGS. 3 and 4, the cushioning element 109 was affixed to the underside of the nut 106. As alternative construction, it is possible to provide the cushioning element 109 to be carried by the armature 107 rather than by the nut 106 and FIG. 5 shows such an embodiment. The operation of this embodiment is exactly the same as that of the previously described embodiment and, for that reason, further description of this embodiment and the description of its operation is not believed to be necessary to enable those skilled in the art to practice the invention.

Figure 6:
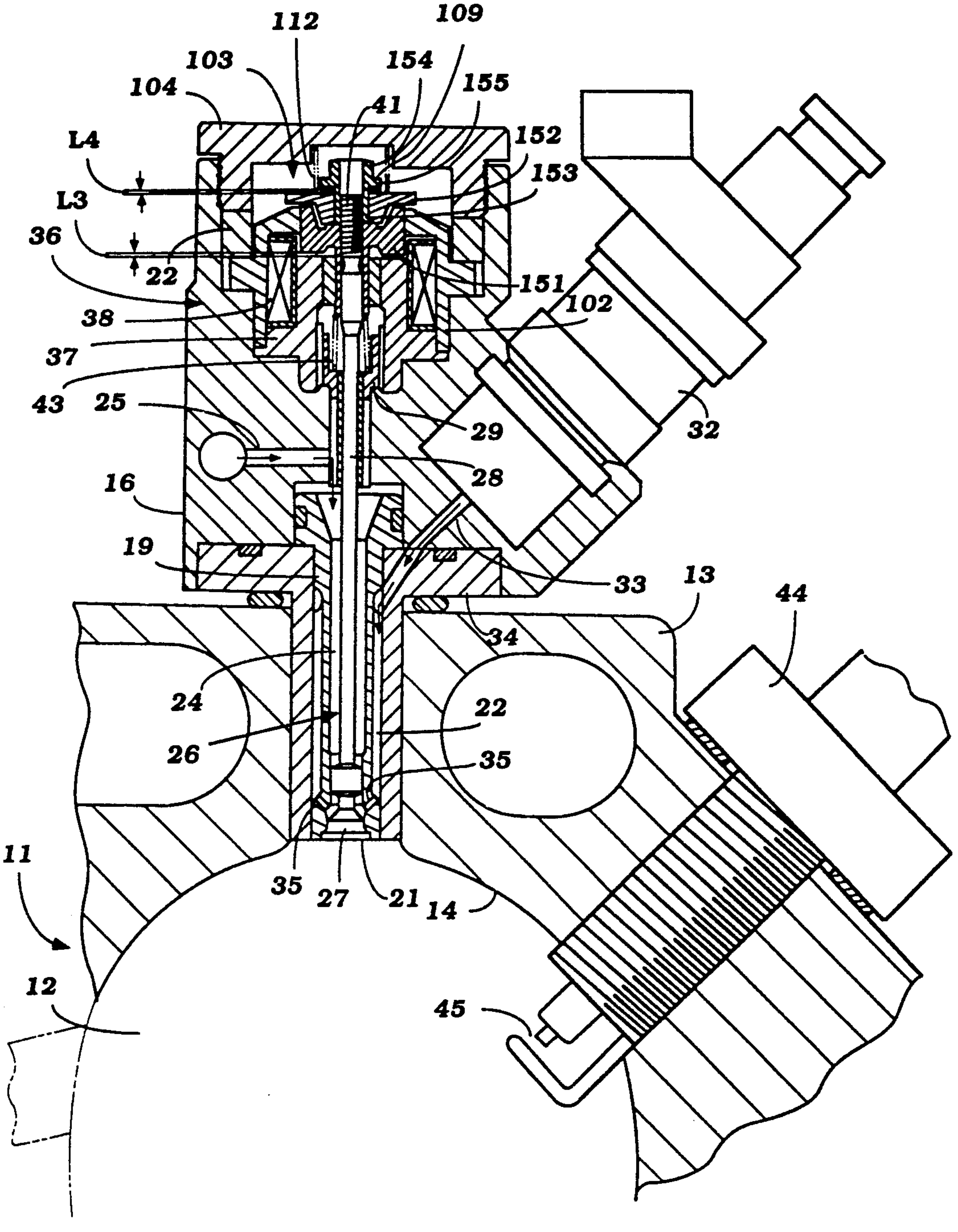
FIG. 6 is cross sectional view, in part similar to FIGS. 3 and 5, and shows yet another embodiment of the invention.

In the embodiments of the invention as thus far described, the entire inertial mass for providing the damping action to prevent bouncing of the valve 26 has been provided by the armature. It is possible, however, to have a separate armature which is fixed to the valve stem and a separate inertial mass and FIG. 6 shows such an embodiment. In this embodiment, components which are the same as the previously described embodiments have been identified by the same reference numerals and will be described again only in so far as is necessary to understand the construction and operation of this embodiment.

In this embodiment, an armature 151 has a threaded connection to the valve stem portion 41. This armature portion 151 therefore is not slidable relative to the stem portion as in previously described embodiments. However, an inertial mass 152 is disposed above the armature portion 151 and is slidably supported upon a sleeve 153 formed as an extension of a nut 154 which is threaded to the stem portion 41. The nut 154 has a cylindrical base portion 155 which forms a stop shoulder and to which is fixed a damping member 109 having a construction as previously described. The spring 112 acts against the inertial mass 155 and urges it downwardly into engagement with the armature 151 for holding these components in engagement with a gap L4 formed between the damping member 109 and the upper portion of the inertial mass 152. The return spring 43 urges the armature 151 upwardly to provide a gap L3 between its lower end and a stop surface formed by the core 37 of the solenoid 36.

Basically this embodiment operates as the previously described embodiments but because of the slightly different construction the operation will be described again. FIG. 6 shows the construction when the valve 26 has been closed and is in a steady state position. When the winding 38 is energized, the armature 151 will be drawn downwardly and since it is directly connected to the valve 26, the valve head 27 will immediately open and move away from the valve seat 21. This downward movement will continue until the gap L3 is taken up and the valve moves fully open.

When the winding 38 is deenergized, the return spring 43 will urge the armature 151 and valve member 26 to its closed position until the head 27 contacts the seat 21. The armature 151 because of its inertia will tend to elongate and the inertial mass 152 will slide along the sleeve 153 until it impacts the cushioning member 109 which will then dissipate its further motion. About this same time, the extension of the valve stem 28 will tend to contract and the impact of the inertial member 152 with the cushioning member 109 will tend to preclude any reopening of the valve head 27. During this sliding movement of the inertial mass 152, the gap L4 is taken up.

The inertial mass 152 will then be urged downwardly by the coil spring 112 and when it impacts the armature 151 there may be some tendency to cause reopening but this will be greatly minimized as with the previously described embodiments.

In this embodiment, the weight of the inertial mass 152 is, like those of the previously described embodiments, set equal to the mass of the upper end of the valve 26. In this embodiment, that mass includes the nut 154, upper portion of the valve stem above the portion 29 and also the armature 151.

From the foregoing description it should be readily apparent that the construction of the various embodiments of injection valves and actuating arrangements therefore are extremely effective in precluding valve bouncing which can result in poor fuel economy, possible misfiring and other disadvantageous results as afore described. Of course, the foregoing description is that of a preferred embodiment of the invention and various changes and modifications may be made without departing from the spirit and scope of the invention, as defined by the appended claims.

We claim:

1. An injection valve for a fuel injection system comprising an injection valve element comprised of a head portion adapted to selectively engage and close a valve seat and move away from said valve seat to an open position for permitting flow therethrough and a stem portion, biasing means for urging said valve to its closed position, an inertial mass supported for movement along said stem portion in opposite directions along an axis of said stem portion, a pair of spaced apart abutment means fixed relative to said stem portion and engagable with said inertial mass for limiting the movement of said inertial mass relative to said injection valve element in both directions, and actuating means for moving said valve element against the action of said biasing means to its opened position and for effecting engagement of said inertial mass with one of said abutment means, said inertial mass being movable along said stem portion when said biasing means urges said head portion into engagement with said seat for engaging one of said abutment means for precluding said head portion from bouncing away from said valve seat.

2. An injection valve for a fuel injection system as set forth in claim 1 wherein the inertial mass has a weight approximately equal to the weight of the upper portion of the valve stem.

3. An injection valve for a fuel injection system as set forth in claim 1 wherein the actuating means comprises a solenoid coil cooperating with an armature carried by the stem portion.

4. An injection valve for a fuel injection system as set forth in claim 3 wherein the armature comprises at least in part the inertial mass.

5. An injection valve for a fuel injection system as set forth in claim 1 further including cushioning means interposed between the inertial mass and the means for limiting the movement of the inertial mass relative to the injection valve element.

6. An injection valve for a fuel injection system as set forth in claim 5 wherein the cushioning means limits the movement of the inertial mass relative to the injection valve element in at least one direction.

7. An injection valve for a fuel injection system as set forth in claim 5 wherein the cushioning element is fixed to the valve stem.

8. An injection valve for a fuel injection system as set forth in claim 5 wherein the cushioning element is affixed to the inertial mass.

9. An injection valve for a fuel injection system comprising an injector valve element comprised of a head portion adaptive to selectively engage and close a valve seat and move away from said valve seat to an open position for permitting flow therethrough and a stem portion, biasing means for urging said valve to its closed position, actuating means for moving said valve element to its open position, an inertial mass supported for movement along said stem portion in opposite directions along the axis of said stem portion, a pair of spaced apart abutment means engageable with said inertial mass for limiting the movement of said inertial mass relative to said injection valve element in both directions, and a cushioning means interposed between said inertial mass and at least of one said abutment means for cushioning the stopping of the movement of the inertial mass.

10. An injection valve for a fuel injection system as set forth in claim 9 wherein the inertial mass has a weight approximately equal to the weight of the upper portion of the valve stem.

11. An injection valve for a fuel injection system as set forth in claim 9 wherein the actuating means comprises a solenoid coil cooperating with an armature carried by the stem portion.

12. An injection valve for a fuel injection system as set forth in claim 11 wherein the armature comprises at least in part the inertial mass.

13. An injection valve for a fuel injection system as set forth in claim 9 wherein the cushioning means limits the movement of the inertical mass relative to the injection valve element in at least one direction.

14. An injection valve for a fuel injection system as set forth in claim 9 wherein the cushioning element is fixed to the valve stem.

15. An injection valve for a fuel injection system as set forth in claim 9 wherein the cushioning element is affixed to the inertial mass.

16. An injection valve for a fuel injection system as set forth in claim 1 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

17. An injection valve for a fuel injection system as set forth in claim 3 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

18. An injection valve for a fuel injection system as set forth in claim 4 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

19. An injection valve for a fuel injection system as set forth in claim 9 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

20. An injection valve for a fuel injection system as set forth in claim 11 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

21. An injection valve for a fuel injection system as set forth in claim 12 wherein the inertial mass is in engagement with one of the abutment means when the injection valve element is in its opened position and moves relative to the valve element to contact the other of the abutment means when the valve element head portion moves into engagement with the valve seat to close the valve seat for reducing bouncing of the injection valve element upon closure.

* * * * *